(12) United States Patent
Pizzorno et al.

(10) Patent No.: US 7,706,640 B2
(45) Date of Patent: Apr. 27, 2010

(54) TELECOMMUNICATION OPTICAL CABLE FOR GAS PIPELINE APPLICATIONS HAVING BUILT-IN LEAKAGE DETECTING DEVICE

(75) Inventors: Massimo Pizzorno, Milan (IT); Alessandro Ginocchio, Milan (IT); Mauro Maritano, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 325 days.

(21) Appl. No.: 10/576,606

(22) PCT Filed: Oct. 23, 2003

(86) PCT No.: PCT/EP03/50746

§ 371 (c)(1),
(2), (4) Date: Nov. 27, 2006

(87) PCT Pub. No.: WO2005/040883

PCT Pub. Date: May 6, 2005

(65) Prior Publication Data
US 2007/0081773 A1    Apr. 12, 2007

(51) Int. Cl.
*G02B 6/00* (2006.01)
*G01J 1/04* (2006.01)

(52) U.S. Cl. .......................... 385/12; 385/13; 385/100; 385/102; 385/103; 385/104; 385/105; 385/106; 385/107; 385/108; 385/109; 385/110; 385/111; 385/112; 385/113; 250/227.14

(58) Field of Classification Search ............ 250/227.14; 137/318; 385/12–13, 100, 102–113
See application file for complete search history.

(56) References Cited

U.S. PATENT DOCUMENTS 6,536,463 B1 *   3/2003   Beals et al. ................. 137/318

(Continued)

FOREIGN PATENT DOCUMENTS

BE      1 235 089 A1 *   8/2002

(Continued)

OTHER PUBLICATIONS

Groswig, Gropner at al., "Distributed Fiber Optic Temperature Sensing Technique", Jun. 2001, Proceedings of the 8th Internatioanl Symposium on Temperature and Thermal Measurements in Industry and Science.*

(Continued)

*Primary Examiner*—Brian M. Healy
*Assistant Examiner*—Guy G Anderson
(74) *Attorney, Agent, or Firm*—Finnegan, Henderson, Farabow, Garrett & Dunner, L.L.P.

(57) ABSTRACT

A telecommunication fiber optic cable for gas pipeline application has a built-in leakage detecting device. The cable has an optical core including a number of telecommunication optical fibers, an outer jacket covering the optical core, and one or more gas leakage detector optical fibers. One or more gas leakage detector optical fibers are enclosed within the outer jacket. Preferably, the cable has a linearly extending rod reinforcing system having strength rods that force the cable to bend in a preferential bending place. Preferably, the leakage detector optical fibers are located at, or close to, a plane that is substantially orthogonal to the preferential bending plane and passing through the cable neutral axis.

26 Claims, 2 Drawing Sheets

U.S. PATENT DOCUMENTS

2002/0125413 A1* 9/2002 Saini ..................... 250/227.14

FOREIGN PATENT DOCUMENTS

| CN | 1414283 | * | 4/2003 |
| --- | --- | --- | --- |
| DE | 195 09 129 A 1 | | 8/1996 |
| DE | EP 0 978 715 B1 | * | 3/2003 |
| EP | 0 978 715 A1 | | 2/2000 |
| EP | 0 978 715 B1 | | 3/2003 |
| JP | 11-38283 | | 2/1999 |
| WO | WO-01/84206 A2 | | 11/2001 |
| WO | WO-03/038839 A1 | | 5/2003 |

OTHER PUBLICATIONS

Leppert et al., "Expereince from the Field Installation of Optical Fibers Cables in metro Gas Pipelines", Proceedings of the 50th IWCS, pp. 747-752.*

Leppert et al.; Experience From the Field Installation of Optical Fiber Cables in Metro Gas Pipelines; Proceedings of the 50$^{th}$ International Wire & Cable Symposium, pp. 747-752, Nov. 12-15, 2001.

Bentley, "A Primer on How to Put Substrates Together"; Paper, Film and Foil Convertes Magazine, vol. 1, pp. 1-3, (2001).

Nakamura; "Power Cable Device Containing Optical Fiber"; Patent Abstracts of Japan of JP 9-306254, Nov. 28, 1997.

Vogel et al.; "Leakage Detection System by Using Distributed Fiber Optical Temperature Measurement"; Proceedings of the SPIE, vol. 4328, pp. 23-34, (2001).

Leppert et al.; Experience From the Field Installation of Optical Fiber Cables in Metro Gas Pipelines; Proceedings of the 50$^{th}$ International Wire & Cable Symposium, pp. 747-752.

St. Großwig et al.; "Distributed Fiber Optical Temperature Sensing Technique—A Variable Tool for Monitoring Tasks"; Proceedings of the 8$^{th}$ International Symposium on Temperature and Thermal Measurements in Industry and Science, pp. 9-17, (2001).

Machine translation of European Patent No. EP 0 978 715 B1 to Grosswig et al.

English Abstract for Chinese Publication No. CN1414283(A) to Jiang et al.

* cited by examiner

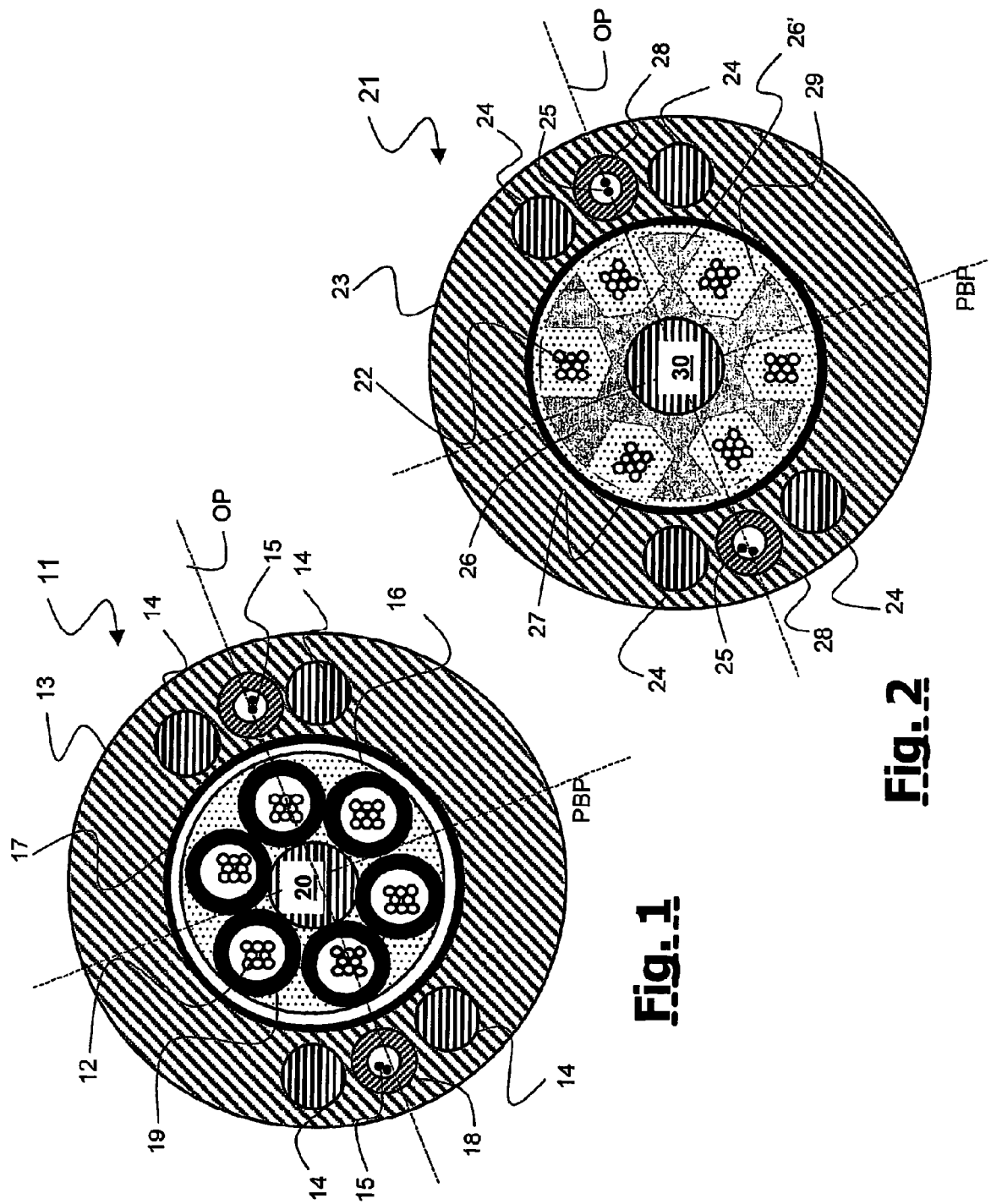

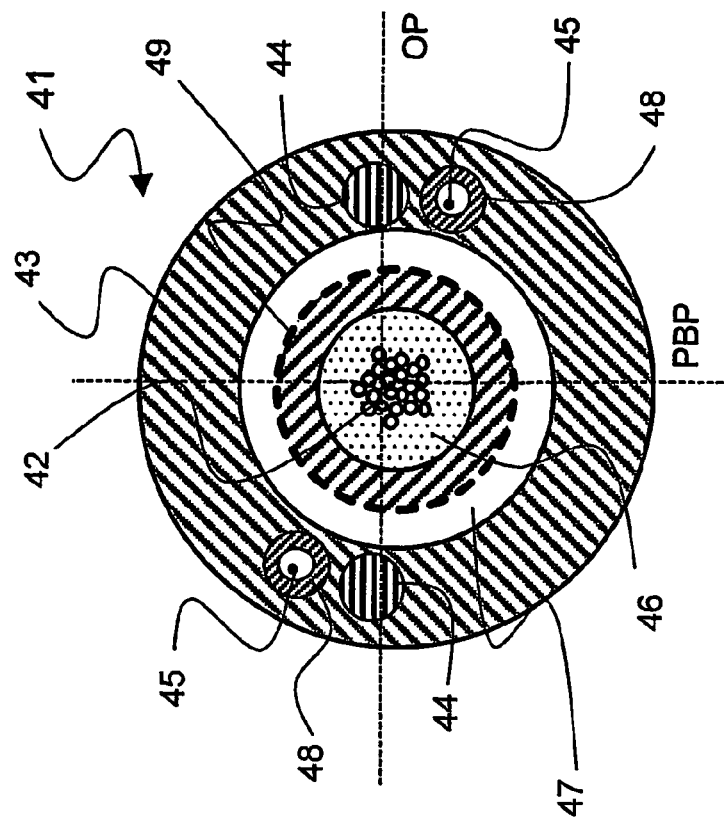
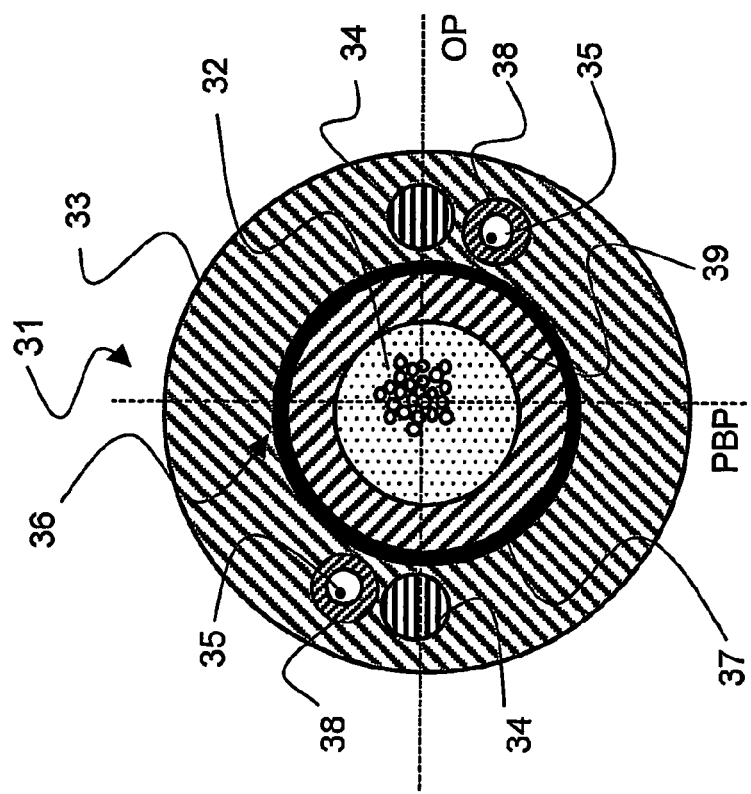

TELECOMMUNICATION OPTICAL CABLE FOR GAS PIPELINE APPLICATIONS HAVING BUILT-IN LEAKAGE DETECTING DEVICE

CROSS REFERENCE TO RELATED APPLICATION

This application is a national phase application based on PCT/EP2003/050746, filed Oct. 23, 2003, the content of which is incorporated herein by reference.

BACKGROUND OF THE INVENTION

1. Field of the Invention

The present invention relates to a telecommunication optical cable to be installed in gas pipelines or the like and in particular an optical cable provided with a built-in leakage-detecting optical device.

2. Description of the Related Art

Demand for higher bandwidth communications to end-users is growing. In this scenario, fiber optics is one of the most effective ways to deliver high bandwidth and fast speed, but fiber optics is rather expensive and difficult to be provided to end users. Typically, fiber optic cables are provided to end-users by burying the cables underground. However, installation of fiber optic cable underground is disruptive to neighborhoods and office areas because public streets and private properties are excavated to some degree. In addition, before excavating streets and properties, right-of-way contracts usually have to be negotiated, thereby wasting time and money. A further possible installation method consists in installing fiber optic cables in existing infrastructures, such as water pipes, sewage tubes and gas pipelines.

In particular situations, installing a fiber optical cable through existing gas pipelines can be very profitable under both the economical and practical point of view. It has been proved that the installation of optical cables through gas pipelines requires specific arrangements and changes in the existing gas pipelines, mainly consisting in the step of mounting input/output proper flanges for allowing the cable to be entered within, or extracted from, the pipeline.

An optical cable that is designed for being installed within a gas pipeline or the like should be provided with special characteristics and features. First, a similar cable should resist to radial pressure forces that are exerted by the fluid (gas) within the pipeline. As it is known, the typical tubes for transporting gas are pressurized up to about 70÷100 bar, the pipes reaching the end user are pressurized at about 100÷300 mbar and the intermediate distribution pipes are pressurized at 4÷18 bar. The radial force resistance of an optical cable is generally obtained thanks to a proper sizing of the cable structure and thanks to a high filling of internal cavities that is obtained by applying jelly and other filling substances.

Second, a similar cable should resist to chemical attacks by the gas. In order to provide such a feature, it is known that a polyethylene-based protective jacket is suitable for the purpose.

Third, a similar cable should resist to gas longitudinal propagation in case of rupture of the external cable jacket. Also in this case, the resistance to gas longitudinal propagation is provided by jelly and other filling substances.

Fourth, a similar cable should resist to gas permeation both radially towards the inside of the cable and out of it. A rather high gas-proofing feature is obtained by a high-thickness high-density polythene outer jacket matched with a longitudinally applied metal tape having overlapping and welded/thermally-sealed edges, or alternatively with an extruded metal tube. The metal barrier complies with two main tasks. From one side, it does not allow that any hydrogen, possibly contained in the natural gas, comes into contact with the optical fibers resulting in a decreasing of the glass transmitting properties. From the other side, it does not allow that the natural gas, in case of entry within the cable, could permeate towards the external ambient where the cable is installed outside the gas pipeline.

Fifth, a similar cable should resist to abrasion and scoring against the walls of the pipelines. In this respect, a HDPE (High Density Polyethylene) sheath provides a low friction coefficient.

The Applicant has tackled the problem of realizing a telecommunication optical cable designed for being installed in gas pipelines or the like that, in addition to the above characteristics, is provided with a built-in gas leakage detecting device.

H.-D. Leppert et al., "Experience from the Field Installation of Optical Fiber Cables in Metro Gas Pipelines", Proceedings of the $50^{th}$ International Wire & Cable Symposium, pp. 747-752, describes in a detailed form a cable for installation through gas pipelines and specially developed I/O ports. It is also mentioned in the paper that the installation of an optical fiber cable inside the gas pipeline offers the additional possibility of implementing a leakage detection system. According to such a contribution, any fiber within the gas pipeline can be used for this application at no additional costs. The cable described in this document has the optical fibers enclosed in buffer tubes arranged around a central element. The buffer tubes are surrounded by a copolymer-coated aluminium tape and a high-density polyethylene sheath. The Applicant observes that, in this cable, the sensitivity of the optical fibers to leakages is poor, due to the various insulating layers provided around them.

EP-0 978 715 B1 discloses a device having at least one multimode fiber optic cable for laser light and a device to measure the propagation time and intensity of the backscattered light, to determine localized temperature anomalies along the cable. At least one single-mode optical fiber cable for message transfer forms a sheated composite arrangement with a compression and tensile resistant element. The cable is laid in the pipe with pressure-tight entry and exit guide connections. EP-0 978 715B1 also discloses a method for installing a fiber bundle cable arrangement for incorporation in the device and a unit for installing the fiber bundle cable arrangement.

DE-195 09 129 A1 concerns a method and device for checking and monitoring the state of tubes, containers, pipelines or the like for conveying liquid or gaseous fluid having temperatures which differ from that of the immediate environment. According to the DE-1 95 09 129 A1, the ambient temperature distribution is determined at least over sections along and/or about the periphery of the tubes, containers, pipelines or the like and/or in the area of the ground adjacent the tubes, containers, pipelines or the like, but outside the fluid-containing space which the latter surround. The ambient temperature distribution is determined by means of a distributed elongate temperature sensor, in particular a fiber-optic sensor cable for distributed temperature measurement. The detection of a local anomaly in the temperature distribution is indicative of a leak. The location, direction of diffusion and extent of the leak can be determined from the temperature distribution at each anomaly point or at each varying point of the anomaly. DE-195 09 129 A1 does not disclose a telecommunication optical cable with built-in leakage detecting device.

St. Großwig et al., "Distributed fiber optical temperature sensing technique—a variable tool for monitoring tasks", proceedings of the 8th International Symposium on temperature and thermal measurements in Industry and Science 19-21 Jun. 2001, pp 9-17, discloses fundamentals of the distributed fiber optical temperature sensing technique which is based on the RAMAN effect and the so-called Optical Time Domain Reflectometry (OTDR). The article describes applications of the distributed fiber optical temperature sensing method. As far as the leakage detection along high-pressure gas pipelines is concerned, it is mentioned that sensor fibers can also be integrated into telecommunication cables. However, the article does not disclose any cable structure that could be used for detecting leakages.

SUMMARY OF THE INVENTION

The Applicant has faced the problem of providing a telecommunication optical cable having a built-in leakage detecting optical device for promptly and reliably detecting any possible leakage or anomaly in gas pipelines or the like where such a cable is installed. Thus, in addition to the need to provide a cable structure which is suitable for being installed in gas pipelines or the like, the Applicant has faced the problem of employing the cable also for safe and reliable gas monitoring purposes.

The gas leakage detecting is based on thermodynamic principles according to which the expansion work of a gas medium results in a lower thermal energy of the gas itself and thus a corresponding lower temperature and a localized cable cooling at the leakage area. The temperature decreasing is of about one or a few Celsius degrees.

According to the present invention, the improved reliability gas leakage detection features are obtained by providing an optical fiber cable wherein the built-in leakage detector comprises one or more optical fibers arranged in the jacket, out of the sealed optical core, preferably rather close to the outer jacket surface.

The present invention provides a telecommunication fiber optic cable for gas pipeline application and having a built-in leakage detecting device, the cable comprising: an optical core including a number of telecommunication optical fibers, either free or grouped in units (such as fiber bundles, fiber ribbons, fiber micromodules, etc.), an outer jacket covering the optical core, and one or more gas leakage detector optical fibers, wherein said one or more gas leakage detector optical fibers are enclosed within the outer jacket.

Preferably, the cable has a neutral axis and a preferential bending plane and the leakage detector optical fibers are located at, or close to, a plane that is substantially orthogonal to the preferential bending plane and passes through the cable neutral axis.

Preferably, the cable comprises a linearly extending rod reinforcing system with strength rods that force the cable to bend in the preferential bending plane. Therefore, the leakage detector optical fibers are preferably close to the strength rods.

Alternatively, if the cable structure does not comprise the external linear extending rod reinforcing system, the leakage detector optical fibers are helically wound by a unidirectional winding.

Still alternatively, the leakage detector optical fibers are helically wound by a SZ-winding.

Preferably, said one or more gas leakage detector optical fibers comprise a primer for providing adherence with the jacket.

Possibly, said one or more gas leakage detector optical fibers comprise a tight protection structure composed by two concentric layers, made of a silicone-based rubber and a polyamide compound, respectively, or alternatively composed by one or more layers made with suitable materials for fiber tight buffering.

Alternatively, the one or more gas leakage detector optical fibers are loosely contained in one ore more tubes.

Preferably, the tubes comprise a primer for providing adherence with the jacket.

Preferably, the tubes contain a jelly.

Preferably, the strength rods comprise a primer for providing adherence with the jacket.

The primer preferably comprises a material selected from the group consisting of: Ethylene Acrylic Acid and their esters, Ethylene Metacrilic Acid and their esters, Ethylene Maleic Anhydride and their esters or a mixture thereof.

Preferably, the cable comprises a metal barrier for gastightly closing the optical core containing the telecommunication optical fibers. As previously stated, the fibers can be free or be grouped in optical fiber units, such as fiber bundles, fiber ribbons, fiber micromodules, etc..

The metal barrier is preferably selected from the group consisting of: thermally sealed Aluminium Poly Laminated; corrugated extruded aluminium tube; non corrugated extruded aluminium tube; corrugated thermally sealed Steel Poly Laminated; non corrugated thermally sealed Steel Poly Laminated; corrugated longitudinal welded steel tube; and non corrugated longitudinal welded steel tube.

According to one embodiment, the optical core comprises a plurality of tubes arranged around a central strength member and loosely housing the telecommunication optical fibers.

Alternatively, the optical core comprises a cylindrical member provided with grooves, each groove housing a number of telecommunication optical fibers.

Still alternatively, the optical core comprises a central tube housing a plurality of telecommunication optical fibers, the central tube comprising PBT or HDPE.

Still alternatively, the optical core comprises a metal central tube and a plurality of telecommunication optical fibers loosely housed therein. Preferably, the cable further comprises a non-metallic central tube, preferably made of plastic or the like, inserted within the metal central tube.

Preferably, the outer jacket has a thickness of at least about 2.0 mm, preferably about 2.6 mm.

Profitably, the reinforcing rods have a diameter of at least about 1.00-1.60 mm, preferably about 1.50 mm-1.60 mm.

BRIEF DESCRIPTION OF THE DRAWINGS

The present invention will become fully clear after reading the following detailed description and having reference to the attached drawings, wherein:

FIG. 1 shows a cross section of a first embodiment of a telecommunication cable according to the present invention;

FIG. 2 shows a cross section of a second embodiment of a telecommunication cable according to the present invention;

FIG. 3 shows a cross section of a third embodiment of a telecommunication cable according to the present invention; and FIG. 4 shows a cross section of a forth embodiment of a telecommunication cable according to the present invention.

DETAILED DESCRIPTION OF THE INVENTION

For the purposes of the present application, with "telecommunication" it is intended any transmission of signals between a first point and a second point, the points being at a distance that could be long, medium or short. Thus, for instance, a telecommunication cable could be a cable providing backbone long-haul links or metropolitan links.

For the purposes of the present invention, it should be also clear that the indicated nominal number of fibers in a cable refers only to the optical fibers that are used for standard telecommunication purposes and does not include the fiber/s used for leakage detecting purposes.

The distributed fiber optical fluid (typically gas) leakage detection method according to the present invention, as said above, relies on the principle that a localized temperature change affects the transmission characteristics of an optical fiber. In turn, the temperature change is the result of an expansion work of a fluid (typically gas) under pressure because of a localized leakage. The distributed fiber optical temperature sensing technique is based on the RAMAN effect and the so-called Optical Time Domain Reflectometry (OTDR) technique. A pulsed laser is coupled to the optical fiber which is the sensing element. In general, the photons interact with the fiber material structure during their propagation along the fiber and, due to that interaction, a small fraction of the light scatters backwards. The spectrum of the scattered light includes the Rayleigh, the Brillouin and the Raman backscattered light. The Raman backscattered light is caused by thermally influenced molecular vibrations and is located in a wavelength band shifted with respect to the wavelength of the incident pulse light. Consequently, the Raman backscattered light carries the information on the temperature of the fiber and can be used to obtain information about the temperature distribution along the fiber.

The measuring technique consists in filtering the Raman components out of the whole backscattered light and to analyse the signal in order to measure the temperature distribution figure along an optical cable installed inside the gas pipeline.

The Applicant has considered the use of at least one optical sensor fiber in an optical telecommunication cable, and has realized that excellent gas leakage detecting performances are obtained when the dedicated optical fiber/s is/are placed near to the outer surface of the optical cable jacket in order to achieve the maximum sensitivity and the minimum response time required for an efficient alarm function. In contrast, the prior art arrangements used to place the distributed gas leakage detector within the sealed optical core, thus showing low sensitivity and delayed response-time performances.

Arranging the fiber sensors close to the outer surface of the optical cable jacket is not free of correlated problems as the optical cable is installed within pressurized gas pipelines. A first correlated problem is a dual mechanical problem which has been noticed and solved by the Applicant. In fact, as said above, gas pipelines are pressurized and the gas leakage detector optical fibers can become stressed by the gas pressure as a consequence of structural cable collapse. The Applicant has solved the above first mechanical problem (cable compression due to gas pressure) by an appropriate cable design and by manufacturing a compact and well filled cable structure, with particular reference to the housing/protection of the fiber sensors, that is suitable for withstanding the external gas pressure. A second mechanical problem comes from the external location of the gas leakage detector optical fiber in the cable structure: due to the above external location, the fiber sensor can be stressed by cable bending. The Applicant has solved such a second mechanical problem by helically winding the leakage detector fiber/s. The helical winding could be either a continuous (i.e. unidirectional) winding or a SZ (i.e. clockwise and counter-clockwise) winding. Alternatively, the Applicant has profitably solved the above second mechanical problem by providing an optical telecommunication cable with a preferential bending plane, namely a plane where the bending takes place. By virtue of such a preferential bending plane, all the cable elements that are far from it (thus at the periphery of the cable, preferably on a plane passing through the cable neutral axis and being orthogonal to the preferential bending plane or in close proximity thereto), do not modify their length and thus are not longitudinally stressed by the cable bending. According to the present invention, the telecommunication optical cable with built-in leakage detecting device preferably comprises a strength system including one or more linearly extending strength rods (in case of two or more rods, they are diametrically opposed). Preferably, the longitudinal rods comprise Glass-Reinforced Plastic and/or Aramid-Reinforced Plastic, typically filamentary strands of glass and/or aramid fibers. Profitably, the leakage detector optical fiber/s is/are arranged as far as possible with respect to the preferential bending plane.

A second correlated problem is in connection with the possible presence of hydrogen within the natural gas flowing in the gas pipeline. The Applicant has solved such a hydrogen presence problem by closing the leakage detector optical fiber/s within one or more sealed tubes, preferably made of steel or aluminium. However, in this respect, the Applicant has also considered that due to the low partial pressure of hydrogen within the natural gas, due to the working wavelength (1064 nm±100 nm) of the temperature detecting systems that is shifted with respect to the attenuation peaks induced both by molecular hydrogen at 1240 nm (first harmonic vibration band) and by bounded hydrogen (OH groups), that affects the fiber attenuation in the 1300-1550 nm wavelength band, and finally due to the low service temperature (close to the room temperature) of gas pipelines, the leakage detector optical fiber/s can be advantageously placed within one or more loose-type tubes made of plastic or the like, for instance made of PBT. According to a further embodiment of the present invention, the leakage detector optical fiber/s could also be realized with a tight protection structure composed by two concentric layers, made of a silicone-based rubber and a polyamide compound, respectively, or, alternatively, realized with one or more layers of suitable materials for such type of protection.

However, the Applicant has considered that the wavelengths for the telecommunication optical fibers are generally higher, for instance between about 1310 nm and 1625 nm, and thus that a high gas-tightening of the telecommunication optical fibers is desirable in order to prevent any negative effect possibly caused by hydrogen. Thus, according to the Applicant, a metal barrier should be provided for gas tightening the optical telecommunication core. However, in some circumstances, for instance when the hydrogen content within the gas is rather low and a limited decay of the optical fiber transmissive properties is still acceptable or when, for further cable protection, the optical cable is inserted within a tube previously installed into the gas pipelines, the optical core could be located within a sheath of HDPE or MDPE without the sealed metallic protection. Preferably, in this case the sheath thickness could be as the thickness of medium/low pressure tube used for gas pipelines that are presently made of similar materials. Typically, this thickness must be at least about 2.0 mm.

The protection feature against possible radial permeation of hydrogen within the cable optical core can be improved by filling the optical core interstices with a hydrogen absorber compound. The hydrogen absorber compound operates for keeping the hydrogen partial pressure low within the optical core and filling all the possible interstices between the optical fibers.

Preferably, also when a metal protection is used for gas-tightening the optical core, it is advisable to use a hydrogen absorber compound or the like for capturing the hydrogen released by the cable components of the optical core.

A third correlated problem faced by the Applicant in designing a telecommunication optical cable with a built-in leakage-detecting device is the possible longitudinal propagation of gas through the cable. As far as the optical core is concerned, the Applicant has realized that a jelly gas-tight optical core provides a good barrier against the possible longitudinal propagation of gas through the cable optical core.

However, the Applicant has identified other possible areas and zones where longitudinal propagation of gas could take place. Those areas comprise: a) the interface surface between jacket and strength rods; b) the interface surface between jacket and tubes containing gas leakage detector optical fibers; c) the interface surface between jacket and gas leakage detector optical fibers (when they are not within one or more tubes); and, finally, d) the interface between jacket and the metal protection of the cable optical core. The Applicant has solved the problem by lining the surface of either the rods, the tubes containing the gas leakage detector optical fibers or directly the gas leakage detector optical fibers if not enclosed in tubes, and the outer surface of the optical core metal protection, by an adhesive primer. Preferably, the primer comprises a material selected from the group consisting of: Ethylene Acrylic Acid (EAA) and their esters, Ethylene Metacrilic Acid (EMA) and their esters, Ethylene Maleic Anhydride (E MA) and their esters or a mixture thereof.

A further possible area where longitudinal propagation of gas could take place is inside the tubes containing gas leakage detector optical fibers. In this respect, the Applicant has realized that a good jelly filling of the tube/s containing the gas leakage detector optical fibers results in no longitudinal gas propagation. According to the Applicant, the jelly filling rate should be ≧80%, preferably ≧85% and more preferably ≧90%. Preferably, the jelly to be used should exhibit reduced volume expansion/contraction thermal coefficient and should have high tixhotropic characteristics. In other words, the jelly should be highly fluid when the optical cable is manufactured and should exhibit high viscosity at static conditions during cable life.

According to a further embodiment, one or more gas-tight metal tubes can be provided for sealingly containing the gas leakage detector optical fiber/s.

A first embodiment of telecommunication optical cable with a built-in leakage-detecting device according to the present invention is shown in FIG. 1. The cable 11 is generally a multi loose tube (MLT) type cable. The cable 11 comprises an optical core 16 containing a number of optical fibers 12 for providing a telecommunication connection; an outer jacket 13; an additional linearly extending rod reinforcing system 14; one or more gas leakage detector optical fibers 15; and a metal barrier 17.

The cable 11 comprises 24-48 optical fibers 12 for providing a standard telecommunication connection, for instance for transferring data from a first to a second end of the cable. The outer jacket 13 can be profitably made, at least partially, by HDPE (High Density Polyethylene) or the like. Preferably, the outer and inner diameter of the jacket are about 13.0 mm and about 7.8 mm, respectively, with the jacket thickness being about 2.6 mm. Obviously, a higher jacket thickness could be provided, resulting in a larger cable. In any case, the Applicant believes that the minimum jacket thickness is strictly dependant on the reinforcing rods housed in the jacket and is given by the reinforcing rod diameter plus at least 0.8 mm, preferably plus at least 1.0 mm. Thus, as it will be explained below, the outer jacket preferably has a minimum thickness of about 2.0 mm.

The additional linearly extending rod reinforcing system 14 of cable 11 comprises four linearly extending, diametrically opposed, strength rods 14 that are embedded in the outer jacket 13. In principle, fewer or more rods could be used but preferably at least two diametrically opposed, strength rods 14 should be provided. Preferably, the rods comprise filamentary strands of glass and/or aramid fibers, more preferably they are made of GRP (Glass-Reinforced Plastic) or ARP (Aramid-Reinforced Plastic). Preferably, the rods 14 have a diameter of about 1.00-1.60 mm, more preferably of about 1.50-1.60 mm. Whilst the rod diameter could be further reduced, the Applicant believes that highly reduced diameter rods could not profitably force the cable to bend in a preferential bending plane.

Preferably, the rod surface is coated with a proper primer providing a perfect adherence with the jacket during the extrusion step. Preferably, the primer is based on a material selected from the group consisting of: Ethylene Acrylic Acid (EAA) and their esters, Ethylene Metacrilic Acid (EMA) and their esters, Ethylene Maleic Anhydride (EMA) and their esters or a mixture thereof. In this way, no channels and interstices are provided between jacket and rods. The rod reinforcing system provides a preferential bending plane PBP in the cable 11, namely a plane where the bending takes place. By virtue of such a preferential bending plane, all the cable elements that are far from it (thus at the periphery of the cable, preferably on a plane OP passing through the cable neutral axis and being orthogonal to the preferential bending plane or in close proximity thereto), do not modify their length and thus are not longitudinally stressed by the cable bending.

As it can be inferred by FIG. 1, the gas leakage detector optical fibers 15 are arranged at (or close to) the plane OP that is orthogonal to the preferential bending plane PBP and passing through the cable neutral axis. In optical cable 11 four optical fibers 15 are provided but it can be understood that less (at least one) or more fibers can be provided in different embodiments. In any case, a fiber redundancy (at least two) is desirable.

In the embodiment of FIG. 1, the gas leakage detector optical fibers 15 are closed within two tubes 18, two fibers 15 within each tube 18. Each tube 18 is made either of a plastic material, preferably PBT or HDPE, and is filled with jelly in order to achieve high resistance to longitudinal gas propagation along its internal channel containing the leakage detector optical fibers. Possibly, each tube 18 can be made of metal, preferably aluminium or steel.

The outer material of the tube, which is incorporated in the jacket hot polyethylene during the manufacturing of the cable, should provide a perfect adherence between tube and jacket. For this reason, each tube 18 is made of, or coated with, one or more primers. In this way, no channels and interstices are provided between jacket and tube/s. The tubes 18 extend longitudinally and are arranged substantially at the plane (OP) that contains the cable neutral axis and is orthogonal to the PBP in order to reduce its deformations when the cable is subject to bending. The outer and inner diameters of tube 18 can be of about 1.60 and 1.00 mm, respectively.

In case the gas leakage detector optical fibers 15 are not loosely protected by tubes 18 but are tightly buffered within two concentric layers made of silicone-based rubber and polyamide compound respectively, or alternatively tightly buffered within one or more concentric layers made of other suitable materials, they are directly embedded within the jacket and their secondary buffer coating should be lined with a primer for a better adherence with the jacket. In this case, the optical fiber diameter is about 0.7-1.0 mm, typically about 0.8-0.9 mm. In any case, the optical fibers 15 advantageously have a diameter smaller than the rod diameter.

The cable 11 further comprises a metal barrier 17, possibly an aluminium poly laminated barrier, for gas-tightly closing the optical core 16. The aluminium thickness may be of about 0.15 mm and the copolymer plating thickness, that provides adhesion to the outer jacket and prevents any possibility of longitudinal gas propagation along jacket-metal barrier interface, may have a thickness of about 0.04 mm. In case of a barrier made by a cylinder-shaped tape, the width of overlapping thermally sealed edges may be of about 6 mm or more. As an alternative, the barrier may be a corrugated steel barrier, Zetabon-type or the like.

While the built-in leakage detecting device optical cables according to FIG. 1 provides very good performances in terms of gas tightening, better performances could be obtained by replacing the metal barrier 17, made by tube shaping a metal belt, by a gas-proof metal tube. The gas-proof metal tube could be obtained by an aluminium extrusion process known as "Conforming" or by forming a metal band (for instance of aluminium or steel, possibly corrugated) into a longitudinally welded pipe, or the like. The gas-proof metal barrier 17 is covered by the jacket where the strength rod system and the leakage detector fibers are housed.

The optical core 16 of the cable according to the present invention comprises an arrangement of six PBT tubes 19 that are wound around a central Glass-Reinforced Plastic support member 20 (as it is common in MLT cables). Preferably, the interstice space between tubes 19 is filled with a jelly or the like. In the embodiment of FIG. 1, the central support member 20 may have a diameter of about 2.4 mm, the tubes 19 may have an outer diameter of about 2.20 mm and an inner diameter of about 1.50 mm. Preferably, the tubes 19 are SZ-stranded around the central member 20 and are bound by a filling-impregnated synthetic tape. Each tube 19 preferably houses 4 to 8, or more, optical fibers (the cable 11 thus having 24-48 optical fibers). The space between the fibers and the tubes 19 is filled with jelly in order to block any longitudinal propagation of gas.

A further embodiment of 24-48 optical fiber cable is shown in FIG. 2. The cable 21 comprises: an optical core 26 including a number of optical fibers 22; a rather thick outer jacket 23; an additional linearly extending rod reinforcing system 24; one or more gas leakage detector optical fibers 25; and a metal barrier 27.

As for the cable 11, the optical fibers 22 provide a standard telecommunication connection, for instance for transferring data from a first to a second end of the cable.

The outer jacket 23 may have the same size and may be made of the same material as the outer jacket 13 of optical cable 11.

The additional linearly extending rod reinforcing system 24 of cable 21 comprises four linearly extending, diametrically opposed, strength rods 24 that are embedded in the outer jacket 23 exactly as the rods 14 of cable 11. In principle, fewer or more rods could be used but preferably at least two diametrically opposed, strength rods 24 should be provided. Preferably, the rods comprise filamentary strands of glass and/or aramid fibers, more preferably they are made of GRP (Glass-Reinforced Plastic) or ARP (Aramid-Reinforced Plastic). Preferably, the rods 24 have a diameter of about 1.00 mm-1.60 mm, more preferably 1.50 mm-1.60 mm. Whilst the rod diameter could be further reduced, the Applicant believes that highly reduced diameter rods could not profitably force the cable to bend in a preferential bending plane. Preferably, the rod surface is coated with a proper primer providing a perfect adherence with the jacket during the extrusion step. The primer comprises a material selected from the group consisting of: Ethylene Acrylic Acid (EAA) and their esters, Ethylene Metacrilic Acid (EMA) and their esters, Ethylene Maleic Anhydride (EMA) and their esters or a mixture thereof. In this way, no channels and interstices are provided between Jacket and rods. The rod reinforcing system 24 provides a preferential bending plane PBP in the cable 21.

As it can be inferred from FIG. 2, the gas leakage detector optical fibers 25 are arranged at the periphery of the cable, in particular at a plane OP (or close thereto) passing through the cable neutral axis and being orthogonal to the preferential bending plane. In optical cable 21 four optical fibers 25 are provided but it can be understood that fewer (at least one) or more fibers can be provided in different embodiments.

In the embodiment of FIG. 2, the gas leakage detector optical fibers 25 are closed within two tubes 28, two fibers 25 within each tube 28. The same considerations (relating to size, material and arrangement) made for tubes 18 of cable 11 can be applied to tubes 28 of cable 21.

As said above, the cable 21 comprises a metal barrier 27, possibly an aluminium poly laminated barrier, for gas-tightly closing the optical core 26. The same considerations relating to use, material and arrangement made for cable 11 can be applied to metal barrier 27 of optical core 26.

The optical core 26 comprises a cylindrical member 26' provided with six grooves 29, each groove housing up to eight telecommunication optical fibers 22. The grooved core 26 is preferably made through an extrusion step starting from a polypropylene (or polythene) based thermoplastic compound, the extrusion being carried out over a central strength member 30. Profitably, the central strength member 30 is made by Glass-Reinforced Plastic. The central strength member diameter can be about 2.4 mm and the outer grooved core diameter can be about 6.8 mm. The grooves 29 could be about 1.5 mm depth. Finally, the optical core may be bound by a filling-impregnated synthetic tape.

While the built-in leakage detecting device optical cables according to FIG. 2 provides very good performances in terms of gas tightening, better performances could be obtained by replacing the metal barrier 27, made by tube shaping a metal belt, by a gas-proof metal tube. The gas-proof metal tube could be obtained by an aluminium extrusion process known as "Conforming" or by forming a metal band (for instance of aluminium or steel, possibly corrugated) into a welded longitudinally pipe, or the like. The gas-proof metal barrier 27 is covered by the jacket where the strength rod system and the leakage detector fibers are housed.

FIG. 3 shows a CLT (Central Loose Tube) telecommunication optical cable according to the present invention. In particular, the cable 31 of FIG. 3 is a 24-fiber optical cable.

The cable 31 comprises an optical core 36; an outer jacket 33; a linearly extending rod reinforcing system 34; one or more gas leakage detector optical fibers 35; and a metal barrier 37. The optical core 36 includes a central tube 39 and a plurality (twenty-four in this example) of optical fibers 32 housed in the central tube 39 for providing a standard telecommunication connection. The space between fibers 32 and central tube 39 is filled with jelly in order to block any longitudinal propagation of gas.

The outer jacket 33 could be profitably made, at least partially, by HDPE (High Density Polyethylene) or the like. Preferably, the outer and inner diameter of the jacket are about 9.5 mm and about 4.3 mm, respectively, with the jacket thickness being about 2.6 mm. Obviously, a higher jacket thickness could be provided, resulting in a larger cable. In any case, the Applicant believes that the minimum jacket thickness is strictly dependant on the reinforcing rods housed in the jacket and is given by the reinforcing rod diameter plus at least 0.8 mm, preferably plus at least 1.0 mm. Thus, as it will be explained below, the minimum jacket thickness could be about 2.0 mm.

The linearly extending rod reinforcing system 34 comprises two linearly extending, diametrically opposed, strength rods that are embedded in the outer jacket 33. In principle, a single linearly extending strength rod 34 could be enough but preferably at least two diametrically opposed, strength rods 34 should be provided. Preferably, the rods comprise filamentary strands of glass and/or aramid fibers, more preferably they are made of GRP (Glass-Reinforced Plastic) or ARP (Aramid-Reinforced Plastic). Preferably, the rods 34 have a diameter of about 1.00-1.60 mm, more preferably of about 1.50-1.60 mm. Whilst the rod diameter could be further reduced, the Applicant believes that highly reduced diameter rods could not profitably force the cable to bend in a preferential bending plane. Preferably, the rod surface is coated with a proper primer providing a perfect adherence with the jacket during the extrusion step. Preferably, the primer is based on a material selected from the group consisting of: Ethylene Acrylic Acid (EAA) and their esters, Ethylene Metacrilic Acid (EMA) and their esters, Ethylene Maleic Anhydride (EMA) and their esters or a mixture thereof. In this way, no channels and interstices are provided between jacket and rods. The rod reinforcing system provides a preferential bending plane PBP in the cable 31.

As it can be inferred by FIG. 3, the gas leakage detector optical fibers 35 are arranged at the cable periphery, close to the plane OP which contains the neutral cable axis and is fundamentally orthogonal to the preferential bending plane PBP. In optical cable 31 two optical fibers 35 are provided but it can be understood that less (at least one) or more fibers 35 can be provided in different embodiments (not shown).

In the embodiment of FIG. 3, the gas leakage detector optical fibers 35 are closed within two respective tubes 38. Each tube 38 is made of a plastic material, preferably PBT or HDPE, and is filled with jelly in order to achieve high resistance to the longitudinal gas propagation along its internal channel containing the leakage detector optical fibers. Alternatively, each tube 38 is made of metal, preferably aluminium or steel.

The outer material of the tubes 38, which becomes in contact with jacket hot polyethylene during the manufacturing of the cable, should provide a perfect adherence between tubes and jacket. For this reason, each tube 38 is coated with one or more primers. In this way, no channels and interstices are provided between jacket and tube/s. The tubes 38 extend longitudinally and are arranged at the cable periphery, substantially at, or close to, the plane OP which contains the neutral cable axis and is fundamentally orthogonal to the preferential bending plane PBP in order to reduce its deformation (and thus the deformation of optical fibers 35) when the cable is subject to bending. The outer and inner diameters of tube 38 could be about 1.60 mm and 1.00 mm, respectively.

In case the gas leakage detector optical fibers 35 are not loosely protected by tubes 38 but are tightly buffered within two concentric layers made of silicone-based rubber and polyamide compound respectively, or alternatively tightly buffered within one or more concentric layers made of other suitable materials, they are directly embedded within the jacket and their secondary buffer coating should be lined with a primer for a better adherence with the jacket.

As said above, the cable 31 comprises a metal barrier 37, possibly an aluminium poly laminated barrier, for tightly closing the optical core 36 (comprising the central tube 39 and the optical fibers 32). The aluminium barrier thickness may be of about 0.15 mm and the copolymer plating thickness may be of about 0.04 mm. In case of a barrier made by a tape, the width of overlapping thermally sealed edges may be of about 6 mm or more. As an alternative, the barrier 37 may be a thermally-sealed steel barrier, Zetabon-type (corrugated or not) or the like. As a further alternative providing improved gas-tightening features, the barrier may be made by forming a metal band of aluminium or steel into a welded longitudinal tube (corrugated or not).

The telecommunication optical fibers 32 within the single central tube 39 may lay straight or SZ-stranded and are preferably grouped in a bundle, for example with three central fibers and other nine around the central three, and the remaining in the external part. The space between the fibers and the tube 39 is preferably filled with a jelly in order to block any longitudinal propagation of gas.

The central tube 39 could be made of PBT or HDPE, can have an inner diameter of 2.2 mm and an outer diameter of 3.5 mm. In case of barrier 37 made by a tape with overlapping thermally sealed edges, the central tube outer surface should be profitably lined or covered by a proper primer for providing a perfect adherence between central tube and barrier.

FIG. 4 shows a fourth embodiment of telecommunication optical cable 41 provided with a built-in leakage detecting device. Differently from the cable 31, the cable 41 comprises a single piece central tube gas-proof barrier 47. Thus, cable 41 comprises an optical core 46; an outer jacket 43; a linearly extending rod reinforcing system 44; one or more gas leakage detector optical fibers 45. The optical core 46 comprises the central gas-proof tube 47 and a plurality (twenty-four in the example) of optical fibers 42 loosely housed in the central tube 47 for providing a standard telecommunication connection. Optionally, the cable 41 also includes a non-metallic inner central tube 49, preferably made of plastic or the like, inserted within the outer central tube 47.

The outer jacket 43 could be profitably made, at least partially, by HDPE (High Density Polyethylene) or the like. Preferably, the outer and inner diameter of the jacket are about 10.7 mm and about 5.5 mm, respectively, with the jacket thickness being about 2.6 mm. A minimum jacket thickness of about 2.0 mm is possible.

The linearly extending rod reinforcing system 44 is as the rod reinforcing system 34 and the description will not be repeated.

Also the description of the gas leakage detector optical fibers 45 and the tubes 48. If any, containing them will not repeated because it exactly corresponds to the one of optical fibers 35 and tubes 38.

The central tube 47 houses the telecommunication optical fibers 42 and jelly in order to block any longitudinal propagation of gas. Preferably, it is made at least partially of aluminium by an aluminium extrusion process known as "Conforming". The outer and inner diameters of the metal central tube is about 5.5 mm and about 3.5 mm, respectively. The metal central tube outer surface should be covered by an adhesive primer (for instance as the previously mentioned ones) for providing a full gas-tightening feature along the interface between the outer jacket and the metal tube.

The inner plastic (or the like) central tube 49 could be made of PBT or HDPE, can have an outer diameter of 3.5 mm and an inner diameter of 2.2 mm. Preferably, the central tube 49 has an outer surface lined or covered by a proper primer for providing a perfect adherence between central plastic tube and central metal tube. Obviously, such a perfect adherence is not requested should the barrier be a gas-tight single piece tube.

The optical fibers 42 may lay straight or SZ-stranded and are preferably grouped in a bundle, for example with three central fibers and other nine around the central three, and the remaining in the external part.

When the plastic central tube 49 is not provided, an optical cable 41 having the same jacket thickness could have a diameter of about 8.9 mm. Correspondingly, the single piece central gas-proof metal tube (possibly made of aluminium and obtained by an aluminium extrusion process known as "Conforming") could have an outer diameter of 3.7 mm and an inner diameter of 2.2 mm.

The tubes 18, 28, 38, 48 could be made of a plastic material, preferably PBT or HDPE, or of a metal material, preferably aluminium or steel. In any case, they are preferably coated with a primer for providing an effective adherence with the jacket.

There has thus been shown and described a novel telecommunication optical cable which fulfils all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is:

1. A telecommunication fiber optic cable for gas pipeline application and having a built-in leakage detecting device comprising:
    an optical core comprising a number of telecommunication optical fibers;
    an outer jacket covering the optical core; and
    one or more gas leakage detector optical fibers, said one or more gas leakage detector optical fibers being enclosed within the outer jacket.

2. The telecommunication fiber optic cable according to claim 1, wherein said cable has a neutral axis and a preferential bending plane and the leakage detector optical fibers are located at, or close to, a plane that is substantially orthogonal to the preferential bending plane and passes through the neutral axis.

3. The telecommunication fiber optic cable according to claim 2, further comprising a linearly extending rod reinforcing system comprising strength rods that force the cable to bend in the preferential bending plane.

4. The telecommunication fiber optic cable according to claim 1, wherein the leakage detector optical fibers are helically wound by a unidirectional winding.

5. The telecommunication fiber optic cable according to claim 1, wherein the leakage detector optical fibers are helically wound by an SZ winding.

6. The telecommunication fiber optic cable according to claim 1, wherein said one or more gas leakage detector optical fibers comprise a tight protection structure composed by two concentric layers made of a silicone-based rubber and a polyamide compound, respectively.

7. The telecommunication fiber optic cable according to claim 6, wherein said one or more gas leakage detector optical fibers comprise a primer for providing adherence with the jacket.

8. The telecommunication fiber optic cable according to claim 1, wherein the one or more gas leakage detector optical fibers are contained in one or more tubes.

9. The telecommunication fiber optic cable according to claim 8, wherein the tubes comprise a primer for providing adherence with the jacket.

10. The telecommunication fiber optic cable according to claim 8, wherein the tubes contain jelly.

11. The telecommunication fiber optic cable according to claim 3, wherein the strength rods comprise a primer for providing adherence with the jacket.

12. The telecommunication fiber optic cable according to claim 1, further comprising a metal barrier for gas-tightly closing the optical core.

13. The telecommunication fiber optic cable according to claim 12, wherein the metal barrier is selected from thermally sealed aluminium poly laminated; corrugated extruded aluminium tube; non corrugated extruded aluminium tube; corrugated thermally sealed steel poly laminated; non corrugated thermally sealed steel poly laminated; corrugated longitudinal welded steel tube; and non corrugated longitudinal welded steel tube.

14. The telecommunication fiber optic cable according to claim 12, wherein the metal barrier comprises a primer for providing adherence with the jacket.

15. The telecommunication fiber optic cable according to any one of claims 7, 9, 11 or 14, wherein the primer comprises a material selected from ethylene acrylic acid and their esters, ethylene methacrylic acid and their esters, ethylene maleic anhydride and their esters, or a mixture thereof.

16. The telecommunication fiber optic cable according to claim 1, wherein the optical core comprises a plurality of tubular elements arranged around a central strength member and loosely housing the telecommunication optical fibers.

17. The telecommunication fiber optic cable according to claim 1, wherein the optical core comprises a cylindrical member provided with grooves, each groove housing a number of telecommunication optical fibers.

18. The telecommunication fiber optic cable according to claim 1, wherein the optical core comprises a central tube housing the telecommunication optical fibers, the central tube comprising polybutylene terephthalate or high density polyethylene.

19. The telecommunication fiber optic cable according to claim 1, wherein the optical core comprises a metal central tube housing the telecommunication optical fibers.

20. The telecommunication fiber optic cable according to claim 19, further comprising a non-metallic central tube inserted within the metal central tube.

21. The telecommunication fiber optic cable according to claim 20, wherein the non-metallic central tube is plastic.

22. The telecommunication fiber optic cable according to claim 1, wherein the outer jacket has a thickness of at least about 2.0 mm.

23. The telecommunication fiber optic cable according to claim 22, wherein the outer jacket has a thickness of about 2.6 mm.

24. The telecommunication fiber optic cable according to claim 3, wherein the reinforcing rods have a diameter of at least about 1.00 to 1.60 mm.

25. The telecommunication fiber optic cable according to claim 24, wherein the reinforcing rods have a diameter of about 1.50 to 1.60 mm.

26. A telecommunication fiber optic cable for gas pipeline application and having a built-in leakage detecting device comprising:
- an optical core comprising a number of telecommunication optical fibers;
- an outer jacket covering the optical core; and
- one or more gas leakage detector optical fibers, said one or more gas leakage detector optical fibers being enclosed within the outer jacket and separated from the optical core.

* * * * *